(12) United States Patent
Hsu

(10) Patent No.: US 6,810,795 B1
(45) Date of Patent: Nov. 2, 2004

(54) MILK FOAM DELIVERY PIPE FOR AN ESPRESSO COFFEE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/714,619

(22) Filed: Nov. 18, 2003

(51) Int. Cl.[7] .......................... A47J 31/40; A47J 31/44; A47J 31/46; A47J 43/12; A23L 1/00
(52) U.S. Cl. .................... 99/453; 99/289 R; 99/293; 99/323.1; 99/452
(58) Field of Search ................... 99/452–455, 275–279, 99/293–295, 291, 289 R, 281–286, 300, 302 R, 323.1–323.3; 261/78.1, 123–126, 121.1, DIG. 16, DIG. 76; 366/101, 163.1, 163.2, 167.1; 426/477

(56) References Cited

U.S. PATENT DOCUMENTS

| | | | | |
|---|---|---|---|---|
| 4,949,631 A | * | 8/1990 | Fregnan | 99/452 |
| 5,476,033 A | * | 12/1995 | Locati | 99/279 |
| 5,768,975 A | * | 6/1998 | Wu | 99/290 |
| 5,931,080 A | * | 8/1999 | Roure Boada | 99/293 |
| 6,192,785 B1 | * | 2/2001 | Trida et al. | 99/284 |
| 6,345,570 B1 | * | 2/2002 | Santi | 99/289 R |
| 6,561,079 B1 | * | 5/2003 | Muller et al. | 99/282 |
| 6,600,875 B2 | * | 7/2003 | Kodden et al. | 392/471 |

* cited by examiner

Primary Examiner—Timothy F. Simone
(74) Attorney, Agent, or Firm—Rosenberg, Klein & Lee

(57) ABSTRACT

A milk foam delivery pipe for an espresso coffee maker includes a steam delivery pipe, a milk delivery pipe, a mixing joint and a milk foam delivery pipe. Both the steam and the milk delivery pipes are connected to the mixing joint. A mixture outlet is disposed in the mixing joint to connect through the milk foam delivery pipe. The milk foam delivery pipe is continuous curving pipe including a first curving section and a second curving section. A milk foam outlet is provided to a free end of the second curving section to produce delicate and well-mixed milk foams.

1 Claim, 4 Drawing Sheets

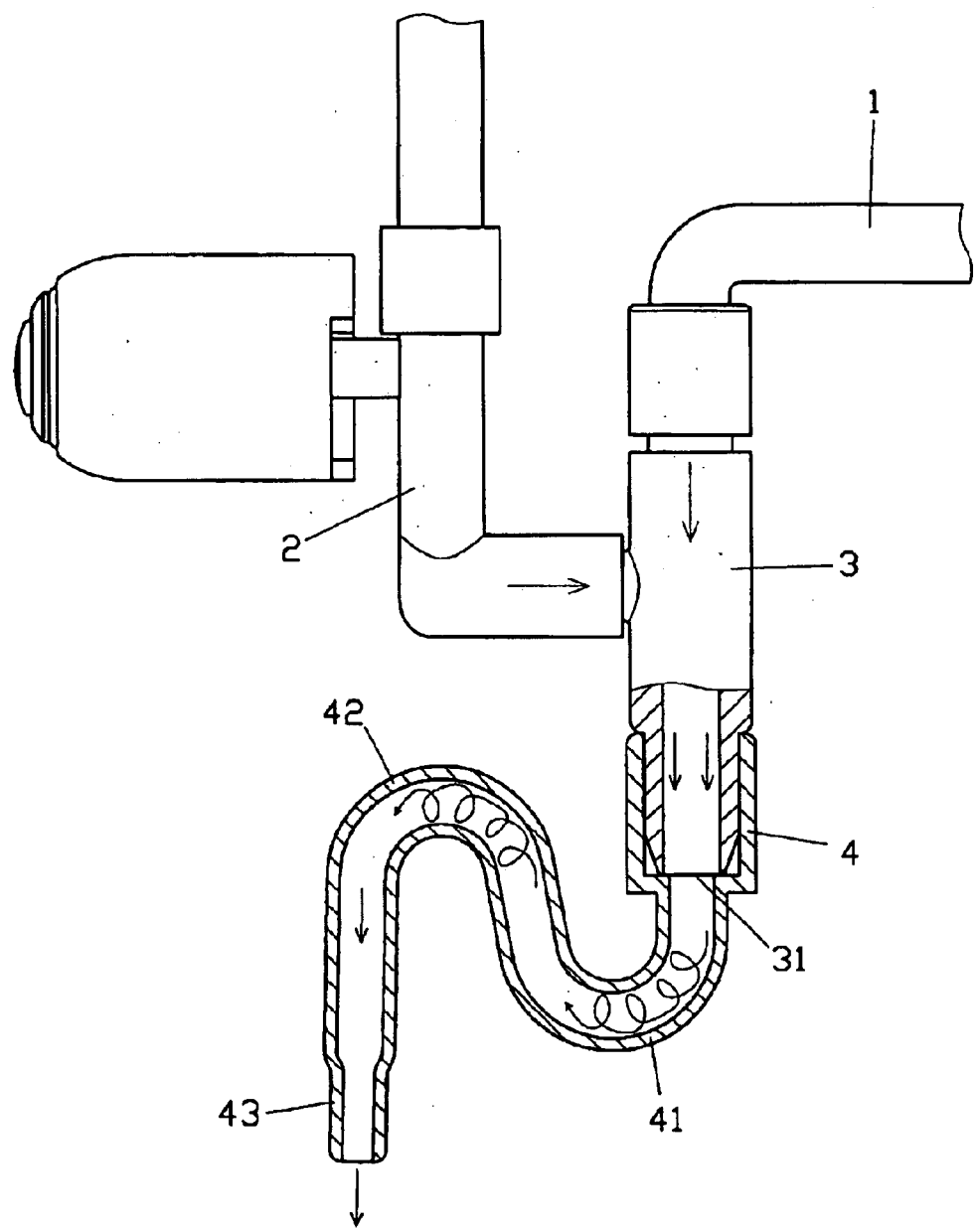
F I G . 3

MILK FOAM DELIVERY PIPE FOR AN ESPRESSO COFFEE MAKER

BACKGROUND OF THE INVENTION (a) Field of the Invention

The present invention relates to a milk foam delivery pipe for an espresso coffee maker, and more particularly to a continuous curving pipe having a first curving section and a second curving section with a milk foam outlet provided to a free end of the second curving section to produce delicate and well-mixed milk foams.

(b) Description of the Prior Art

The milk foam delivery structure for an espresso coffee maker of the prior art as taught in U.S. Pat. No. 4,949,631; U.S. Pat. No. 5,207,148; U.S. Pat. No. 5,476,033; U.S. Pat. No. 5,768,975; U.S. Pat. No. 5,931,080 and U.S. Pat. No. 6,192,785 patents usually includes a steam delivery pipe (5), a milk delivery pipe (6), a mixing joint (7), and a milk foam delivery pipe (8), as illustrated in FIG. 4 of the accompanying drawings. Both the steam delivery pipe (5) and the milk delivery pipe (6) are respectively connected to the mixing joint (7). The mixing joint (7) is directly connected to the straight milk foams delivery pipe (8) so that the mixture of steam and milk is directly delivered (mixed with air, too) into a coffee cup (not illustrated) to produce milk foam.

However, the steam, milk and air are not well mixed due to that the milk foam delivery pipe (8) is straight and shorter. Though milk foam is produced, it requires greater steam pressure, and its taste is rough since the milk foams are larger and not well mixed to deliver the delicate taste available in an ordinary coffee shop.

In the coffee shop, steam at lower pressure is directly introduced into the milk to take longer time in making delicate milk foam, which is not possibly made by an automatic drip coffee maker at home.

Therefore, the prior art requires a further improvement for a fast and more efficient way for the espresso coffee maker to produce delicate and well-mixed milk foams.

SUMMARY OF THE INVENTION

The primary purpose of the present invention is to provide a milk foam delivery pipe for an espresso coffee maker to produce delicate milk foams using steam at lower pressure. To achieve the purpose, the present invention includes a steam delivery pipe, a milk delivery pipe, a mixing joint and a milk foam delivery pipe. The steam delivery pipe and the milk delivery pipe are respectively connected to the ring joint. A mixture outlet is disposed in the mixing joint. The mixture outlet is connected through the milk foam delivery pipe characterized by that the milk foam delivery pipe is a continuous curving pipe.

Another purpose of the present invention is to provide a milk foam delivery pipe for an espresso coffee maker to produce delicate and well-mixed milk foams using steam at lower pressure. To achieve the purpose, the present invention includes a steam delivery pipe, a milk delivery pipe, a mixing joint and a milk foam delivery pipe. The steam delivery pipe and the milk delivery pipe are respectively connected to the mixing joint. A mixture outlet is disposed in the mixing joint. The mixture outlet is connected through the milk foam delivery pipe characterized by that the milk foam delivery pipe is a continuous curving pipe including a first curving section and a second curving section with a milk foam outlet disposed to a free end of the second curving section.

BRIEF DESCRIPTION OF THE DRAWINGS

FIG. 3 is a sectional view of the preferred embodiment of the present invention.

DETAILED DESCRIPTION OF THE PREFERRED EMBODIMENTS

Figure 1:
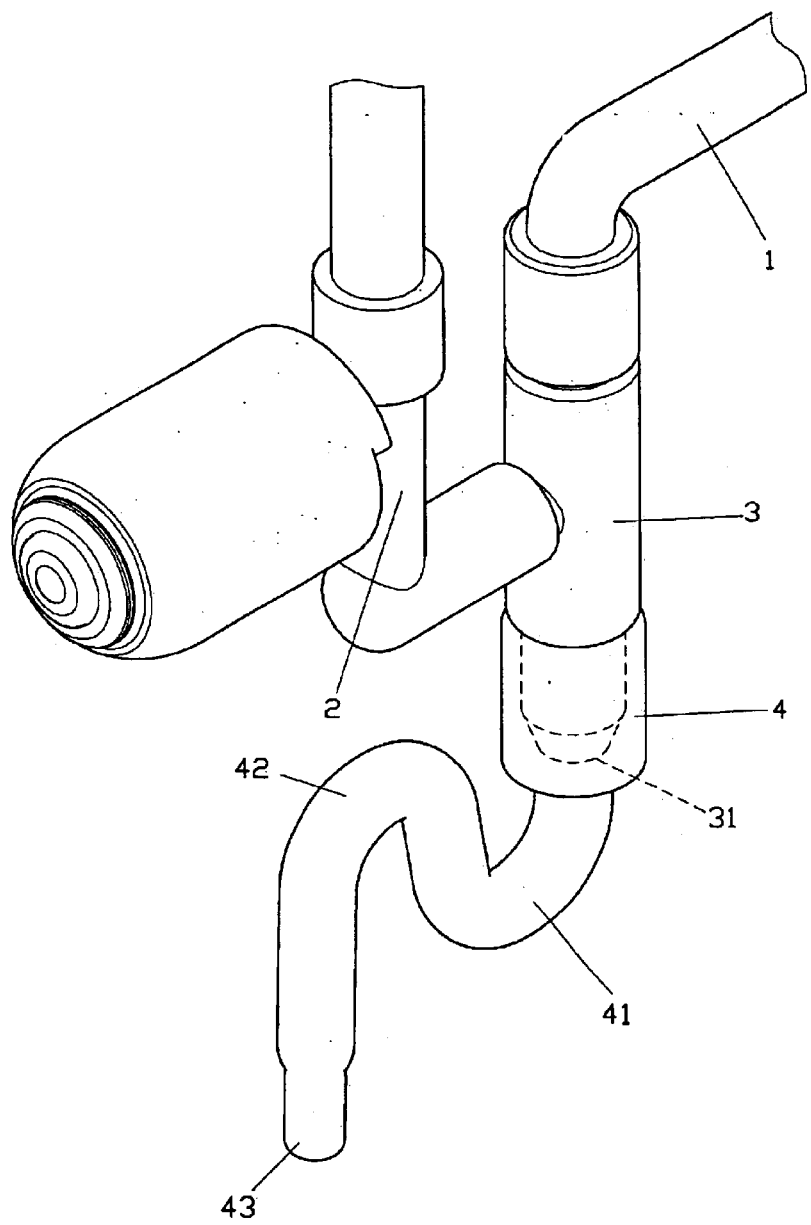
FIG. 1 is a perspective view of a preferred embodiment of the present invention.
Figure 2:
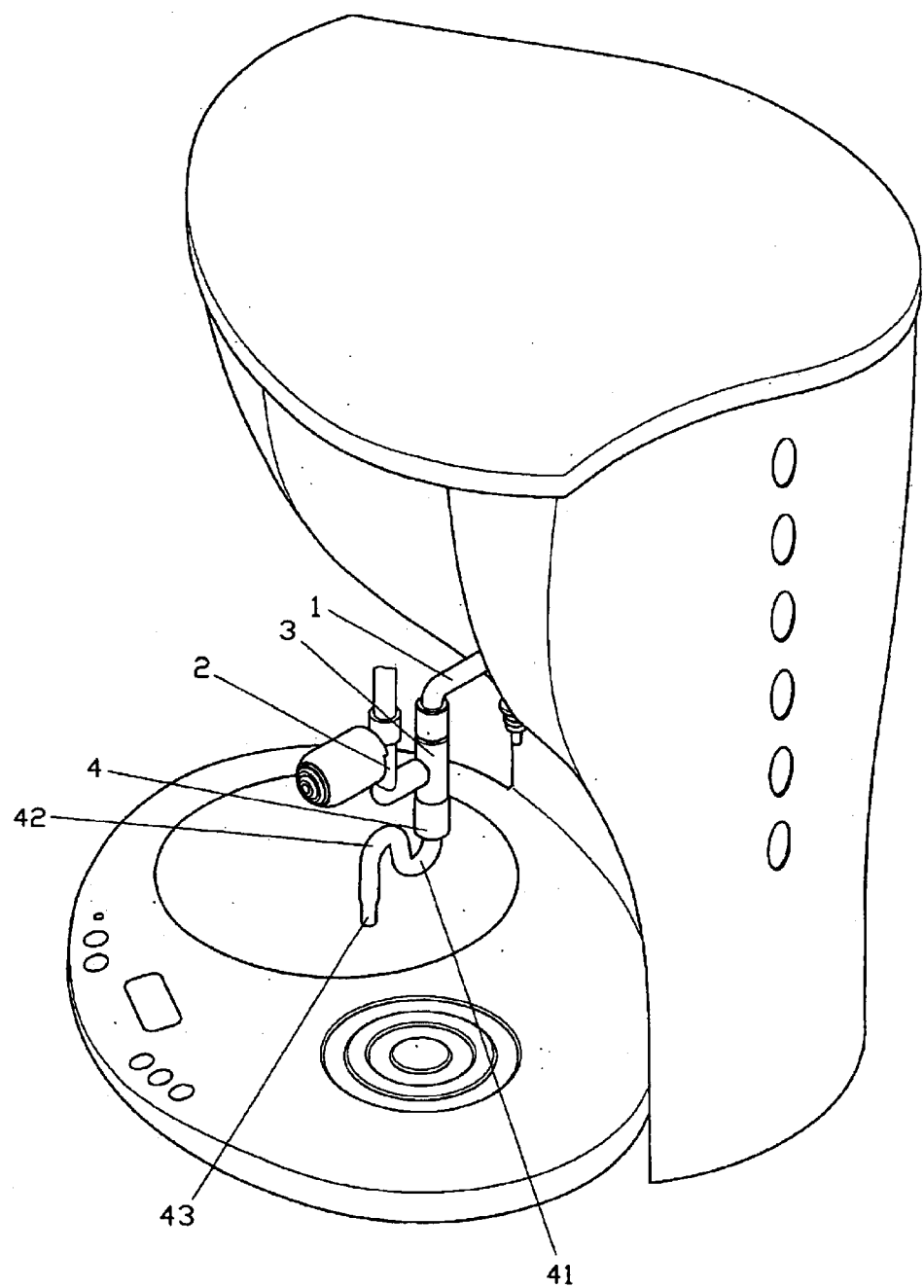
FIG. 2 is a perspective view of the preferred embodiment applied to an espresso coffee maker.
Figure 4:
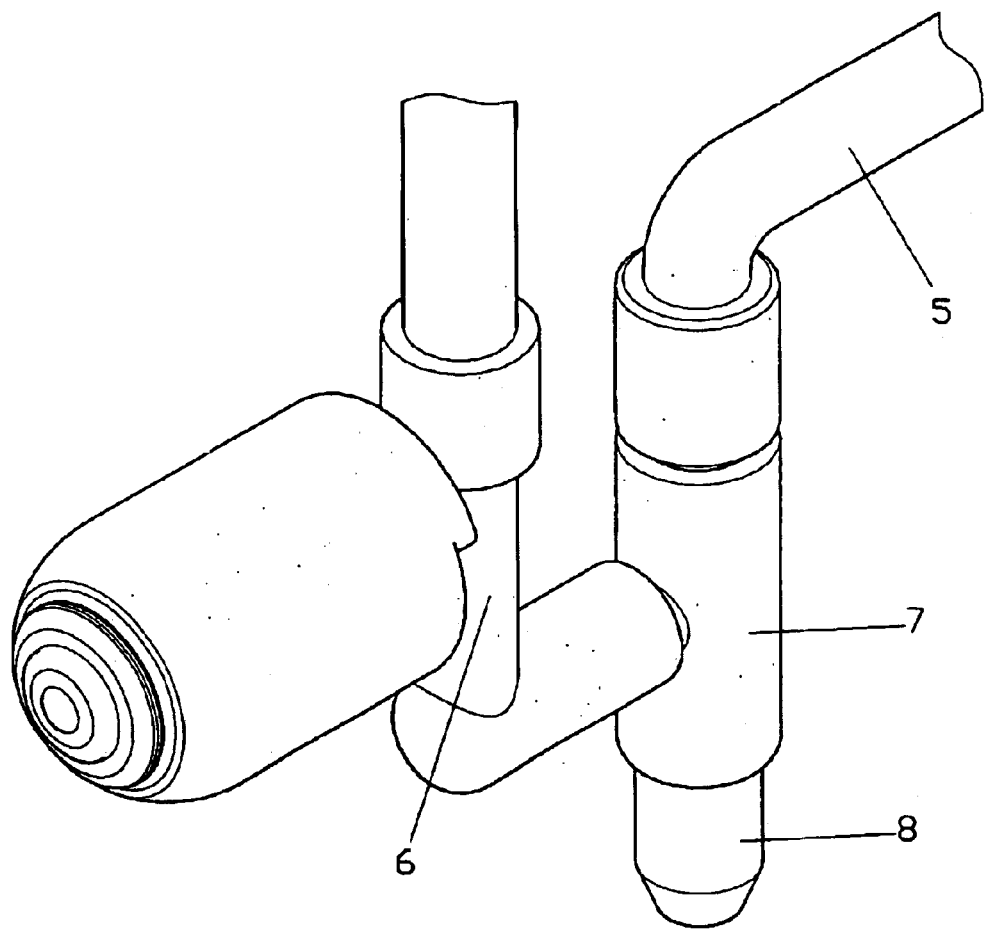
FIG. 4 is a perspective view of a prior art.

Referring to FIGS. 1 and 2 respectively for a perspective view of a preferred embodiment of the present invention and another perspective view showing that the preferred embodiment of the present invention is applied in a coffee maker, the preferred embodiment of the present invention essentially comprises a steam delivery pipe (1), a milk delivery pipe (2), a mixing joint (3) and a milk foam delivery pipe (4).

The steam delivery pipe (1) and the milk delivery pipe (2) are respectively connected to the mixing joint (3). A mixture outlet (31) is disposed in the mixing joint (3). The mixture outlet (31) is connected to the milk foam delivery pipe (4). The milk foam delivery pipe (4) is a continuous curving pipe including a first curving section (41) and a second curving section (42). A milk foam outlet (43) is provided to a free end of the second curving section (42).

In practice as illustrated in FIG. 3, the mixture of milk foam and steam at lower pressure is not well mixed at the time the mixture is just leaving the mixture outlet (31) of the mixing joint (3) to enter into the milk foam delivery pipe (4); however the mixture becomes well-mixed and delicate milk foams after the repeated mixing through the first curving section (41) and the second curving section (42) of the milk foam delivery pipe (4) before being delivered through the milk foam outlet (43).

The present invention by having the milk foam delivery pipe (4) made into a curving pipe provided with continuous first and second curving sections (41) and (42) and the milk foam outlet (43) disposed to the free end of the second curving section (42) to take advantage of steam at lower pressure for producing well mixed and delicate milk foams.

I claim:

1. A milk foam delivery pipe for an espresso coffee maker comprising a steam delivery pipe, a milk delivery pipe, a mixing joint and a milk foam delivery pipe; the steam delivery pipe and the milk delivery pipe being connected to the mixing joint; a mixture outlet being disposed in the mixing joint to connect through the milk foam delivery pipe, and characterized by:

the milk foam delivery pipe being a continuous curving pipe having first and second curving sections forming a tortuous flow path, the milk foam delivery pipe having an inlet from which a flow passes downwardly to the first curving section, the first curving section directing the flow upwardly to the second curving section, the second curving section directing the flow downwardly to a milk foam outlet.

* * * * *